United States Patent
Kochubei

(10) Patent No.: US 9,427,689 B2
(45) Date of Patent: Aug. 30, 2016

(54) UNIFLOW CENTRIFUGAL GAS-LIQUID SEPARATOR

(71) Applicant: Iurii Kochubei, Moscow (RU)

(72) Inventor: Iurii Kochubei, Moscow (RU)

(*) Notice: Subject to any disclaimer, the term of this patent is extended or adjusted under 35 U.S.C. 154(b) by 78 days.

(21) Appl. No.: 14/708,419

(22) Filed: May 11, 2015

(65) Prior Publication Data

US 2016/0096129 A1     Apr. 7, 2016

(30) Foreign Application Priority Data

Oct. 3, 2014   (RU) ................................ 2014140212

(51) Int. Cl.
| | |
|---|---|
| *B01D 45/12* | (2006.01) |
| *B01D 45/16* | (2006.01) |
| *B01D 45/08* | (2006.01) |
| *B01D 50/00* | (2006.01) |
| *F01M 13/04* | (2006.01) |

(52) U.S. Cl.
CPC ............... *B01D 45/16* (2013.01); *B01D 45/08* (2013.01); *B01D 45/12* (2013.01); *B01D 50/002* (2013.01); *F01M 13/04* (2013.01)

(58) Field of Classification Search
CPC .... B01D 45/08; B01D 45/16; B01D 50/002; B01D 45/12; F01M 13/04
USPC ......... 55/456, 457, 462–465, 447, 428, 431, 55/432, 319
See application file for complete search history.

(56) References Cited

U.S. PATENT DOCUMENTS

| | | | | |
|---|---|---|---|---|
| 7,338,545 | B2 * | 3/2008 | Bazzarella et al. | 55/399 |
| 7,503,950 | B2 * | 3/2009 | Håland | 55/315 |
| 8,852,323 | B2 * | 10/2014 | Schook | 95/271 |
| 9,005,354 | B1 * | 4/2015 | Cox | 96/372 |
| 2003/0115843 | A1 * | 6/2003 | Haland | 55/392 |
| 2008/0271421 | A1 * | 11/2008 | Darke et al. | 55/396 |

* cited by examiner

*Primary Examiner* — Dung H Bui
(74) *Attorney, Agent, or Firm* — Nadya Reingand

(57) ABSTRACT

This invention is intended to prevent carry-over of the liquid phase and solid particles, decrease loss of head, and simplify design in centrifugal separators. The separator comprises a cylindrical body, inlet and outlet pipes aligned with the body and a swirler. The diameter of separation pipes is smaller than the internal diameter of the body; the end of the inlet pipe is expanded against the inlet pipe making a parallel-plate duct inside the cylindrical duct. The swirler is installed in the inlet pipe comprising a cone with its top positioned towards gas-liquid flow. The cylindrical pipe is fixed to the cone base. The flat plates are mounted circumferentially along the internal surface of the inlet pipes located at 25-35° to the cone guide; and between the external diameter of the outlet pipe and the external diameter of the body there is a cylindrical flow damper.

5 Claims, 1 Drawing Sheet

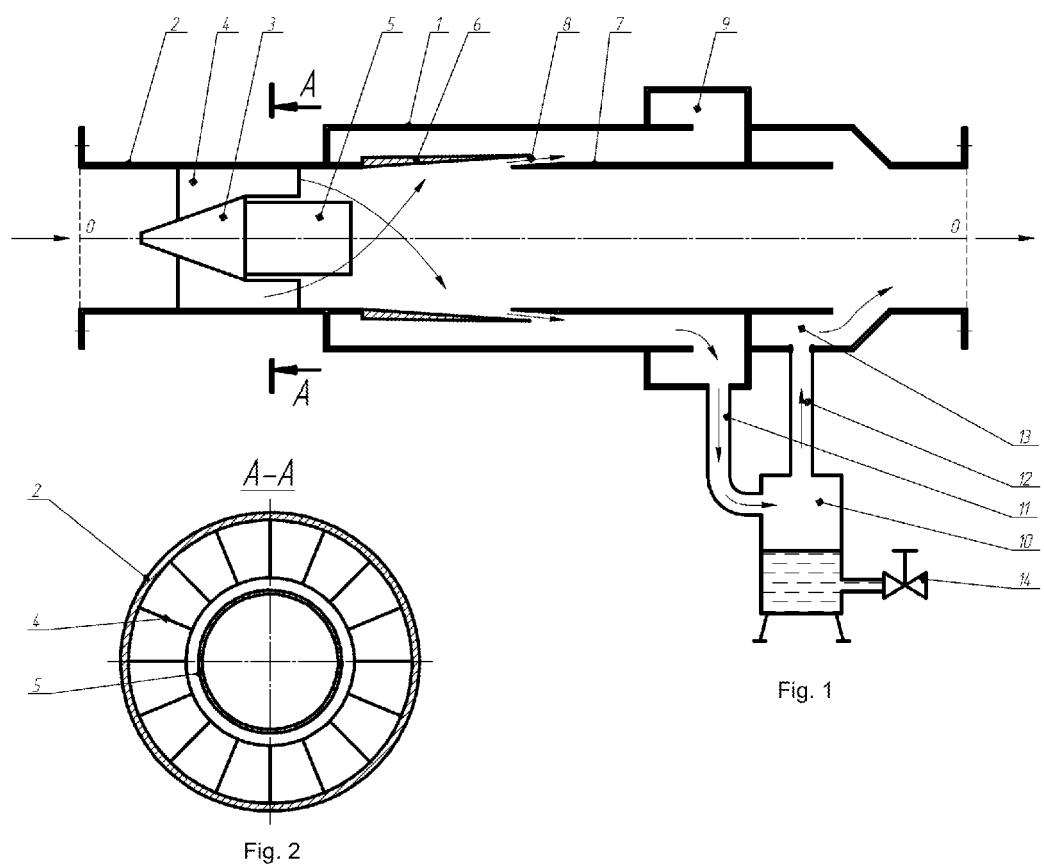

UNIFLOW CENTRIFUGAL GAS-LIQUID SEPARATOR

RELATED APPLICATION DATA

The current patent application claims priority to Russian application No. RU2014140212 filed on Oct. 3, 2014.

FIELD OF INVENTION

This invention belongs to uniflow centrifugal separators for separation of liquid and solid particles from the gas-liquid flow through the centrifugal force and can be used in gas, oil, chemical, mining industry, thermal power production and other technical applications.

BACKGROUND

There is a known gas-liquid separator (SU 501765, publ. 31 May 1974), performing uniflow liquid separation from the gas flow. Separator consists of the vertical cylindrical body with draining partition installed on the plate including blade swirler with horizontal openings at the inlet, and the separation branch pipe above the cylindrical body with an additional partition with cylindrical pipe in the center. Above the diaphragm there are drain openings; above the cylindrical pipe is a truncated cone with clearance at the outlet of the separation unit.

A deficiency of this design is that both lower and upper parts of the separation unit are not intended to operate for transportation of the gas-liquid flow with solid matter. The presence of cylindrical sections with equal diameters both in upper and lower parts of the separation unit limits consumption of separator when gas phase load is increased, because the spiral of whirlpool flows changes in height, i.e. expanded, therefore, centrifugal properties of the binary flow are changing along its path to decreasing. This leads to slipping of the liquid fraction between the cylinders, i.e. loss of the liquid phase with the solid particles.

The closest analog of the present invention is the Uniflow Gas-Liquid Separator (SU 856501, published 30 Oct. 1979). This separator contains the vertical cylindrical body with draining partition installed on the plate including a blade swirler with horizontal openings at the inlet, and the separation branch pipe above the cylindrical body with diaphragms at the outlet. For intensification of the thin-wall drops separation from the flow the separator has an additional partition installed prior the drain partition above the plate; and the body wall has openings above the bottom edge of the additional partition. The separator has a fairing installed at the openings level.

A deficiency of this design is that both upper and lower parts of the separation unit cannot operate with solid particles in the gas-liquid flow by the same reason as in the separator of SU 501765. The presence of cylindrical sections with equal diameters both in upper and lower parts of the separation unit limits consumption of the separator when gas phase load is increased, because the spiral of whirlpool flow changes in height, i.e. expanded, therefore, centrifugal properties of the binary flow are changing along its path to decreasing. This leads to slipping of the liquid fraction between the cylinders, i.e. loss of the liquid phase with the solid particles.

With increased gas flow through the separator, i.e. intensified operation of the known separator, after spinning of the gas-liquid flow the particles will pass the first chamber and furthermore, i.e. return to the process. Great number of the gas return flows and spinning create a certain resistance in the known separator. The known separator also contains vertical cylindrical body with draining partition installed on the plate, which prevents operation in horizontal position and restricts application options.

The goal of this invention is to increase efficiency and reliability of separation in the wide range of loads and expand the scope of application.

SUMMARY

As a solution, the uniflow centrifula gas liquid separator contains a body; wherein a body is cylindrical, an inlet separation and an outlet separation pipe; wherein said pipes aligned with the body and the swirler. The diameter of the inlet separation and the outlet separation pipe is smaller than the internal diameter of the body; the end of the inlet separation pipe is expanded against the inlet pipe making an annular duct created by a parallel-plate duct inside the cylindrical duct. The swirler is installed in the inlet separation pipe comprising a cone with its top positioned towards gas-liquid flow. The cylindrical pipe is fixed to the cone's base. The flat inclined plates are mounted circumferentially along the internal surface of the inlet separation pipe located at 25-35° to the cone; wherein the cone serves as a guide for the flow and between the external diameter of the outlet separation pipe and the external diameter of the body there is a cylindrical gas-liquid flow damper with external diameter bigger than the external diameter of the separator body.

The swirler provides swirling of gas-liquid flow causing centrifugal force; and the density difference of the gas and liquid phases provides separation making liquid and solid particles transfer to the internal surface of the inlet separation pipe followed by the separation of the dense phase in the separation zone.

Overlapping between the expanded body at the end of the internal surface of inlet separation pipe and the beginning of the external surface of outlet separation pipe creates parallel-plate duct, which removes the film liquid phase from the binary gas/liquid mixture. The cylindrical gas-liquid flow damper creates static overpressure and suction of separated gas flow at the outlet, which enables to utilize the gas volume running through the parallel-plate duct.

Installation of the cylindrical pipe to the cone's base in the swirler makes it possible to move the whirling zone, created in the flow center due to rotation, from the swirler end to the end of cylindrical pipe, therewith liquid phase is attaching to the cone internal surface of the outlet separation pipe due to surface tension and centrifugal force on its way to the duct excluding the secondary carry-over of the liquid phase and solid matter.

The claimed separator has a cylindrical gas-liquid flow damper as opposed to the prototype where foreign materials return to the cycle. In the claimed separator, after rotation and separation of the flow, the foreign matter flow velocity is damped; particles fall out of the flow and stream down to the tank by gravity. When the separator gas consumption increase, i.e. operation intensified, the higher gas velocity is, the more is centrifugal force; particles even more pressed to the walls making better purification. Therefore, the claimed separator has a bigger potential throughput capacity with the same possible pressure loss as with the prototype. It provides lower specific quantity of metal with the same cost level. The claimed separator can operate both in vertical and horizontal position of the body.

The new technical effect, obtained by this invention, consists in increase of the Separator throughput capacity, decrease of the head loss, and design simplification.

BRIEF DESCRIPTION OF DRAWINGS

Attached to the invention are the drawings, where FIG. 1 displays the cross-section of Gas-liquid Separator; FIG. 2 is Section A-A.

DETAILED DESCRIPTION OF THE PREFERRED EMBODIMENT

The separator consists of a separator body 1, wherein the separator body is positioned horizontally, an inlet separation pipe 2, a swirler including the cone 3 with its top towards the flow, the plates 4 inclined at 25-35° to the cone 3; wherein the cone serves as a guide for flow the cylindrical pipe 5 mounted on the cone's base. The inlet separation pipe 2 ends with the conical expanding surface 6 along the gas-liquid flow. The inlet separation pipe 2 and the outlet separation pipe 7 have the same diameter, which is smaller than the body internal diameter, and the beginning of the outlet separation pipe 7 of the external diameter is made as an expanding cone. The end of the inlet separation pipe 2 and the beginning of the outlet separation pipe 7 are overlapping making a through cylindrical, parallel-plate duct 8; creating an annular duct opening. At the end of the outlet separation pipe 7 there is a cylindrical gas-liquid flow damper 9, cylindrical buffer vessel 10, inlet pipeline 11, connecting the cylindrical gas-liquid flow damper 9 with buffer vessel 10, outlet pipeline 12, connecting the buffer vessel 10 with the space 13 created in the end of the separator body 1. In the bottom part of the buffer vessel 10 there is a drain valve 14.

The uniflow gas-liquid centrifugal separator operates as follows: unseparated gas-liquid flow from the main gas line runs through the inlet separation pipe 2 to separator and transported to the swirler consisting of the cone 3, inclined plates 4, inclined at 25-35° to the cone 3; wherein the cone serves as a guide for the flow and cylindrical pipe 5 installed on the cone's 3 base. Running on the expanding surface of the cone 3 the flow gets to the space between the inclined plates 4 and this surface. When the gas-liquid flow is running in the space between the internal surfaces of the inlet pipe 2, expanding conical surface 3, and 25-35° inclined plates 4, the centrifugal force is created. Gas/liquid density difference makes them separate. Liquid runs along the internal surface of the inlet separation pipe 2 and, as a film, and goes spiral with insignificant gas quantity through the cylindrical parallel-plate duct 8 to the cylindrical gas-liquid flow damper 9.

In the cylindrical gas-liquid flow damper 9 the kinetic energy of the gas flow turns into static energy, therewith, the total static head in the cylindrical gas-liquid flow damper 9 is more than the static pressure inside the inlet pipe 7. Rotary movement of the gas phase directly behind the swirler may result in whirling and drawing into the axial zone of separator some quantity of the liquid phase, which is then, as a cord, transported along the separator's axis providing therefore carry-over of some liquid phase, and decreasing the separation efficiency. To prevent the aforesaid, the cylindrical pipe 5 moves the zone of whirling along the Separator's axis for the length of the cylinder. Due to this section the liquid phase is able to get attached to the internal surface of the inlet pipe. Availability of centrifugal force and surface tension excludes detachment of the liquid film from the internal surface of the inlet pipe, which removes it through the cylindrical clearance created by the cylindrical parallel-plate duct 8 to the cylindrical gas-liquid flow damper 9.

Due to pressure difference, gas with film-and-dropping liquid runs through the pipeline 11 to the buffer vessel 10 where uniflow flow is divided into the gas and liquid phases. The drain valve 14 removes liquid from the system, and purified gas flow runs through the pipeline 12 to the space 13. This flow diagram has become possible due to increase of static pressure in the cylindrical gas-liquid flow damper 9 and suction in the space 13.

Application of the claimed invention enables to increase efficiency and reliability of separation in the wide range of loads, as well as expand its application sector due to the possibility of both vertical and horizontal positioning of the body.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A uniflow centrifugal gas-liquid separator, comprising:
   a cylindrical body, having a uniform diameter throughout;
   an inlet pipe and an outlet pipe; wherein ensemble of said inlet and outlet pipes is identified as a separation pipes hereinafter; wherein said separation pipes have equal diameters and are coaxial to each other; wherein said separation pipes are also coaxial with the cylindrical body; wherein a the diameter of the separation pipes being smaller than an internal diameter of the cylindrical body; an end of the inlet pipe is expanded against a front part of the outlet pipe creating an annular duct inside the cylindrical body; wherein the annular duct is further produced by simultaneous thinning of a walls of said separation pipes;
   a swirler, being coaxial to said separation pipes and the cylindrical body; the swirler is installed inside the inlet pipe; the swirler comprising a cone with its top positioned towards a gas-liquid flow; wherein further a vertex of the cone is facing towards a direction of a flow and thus separates the flow;
   a swirler cylindrical pipe is attached to a base of the cone; a flat blades of the swirler are mounted circumferentially on an internal surface of the inlet pipe; the blades are positioned at a 25-35° angle to the cone;
   wherein a fluid has completely separated out of the said gas-liquid flow once it clears a region comprising combination of said separation pipes, swirler and swirler cylindrical pipe and only gas is allowed to proceed thereafter; a gas flow than is proceed to flow through an opening in the cylindrical body having a uniform diameter throughout;
   and wherein a cylindrical gas-liquid flow damper is placed between an external surface of the outlet pipe and an internal surface of the body.

2. The separator of claim 1; wherein a diameter of the cylindrical gas-liquid flow damper is larger than an external diameter of the cylindrical body.

3. The separator of claim 1; further comprising a buffer vessel with a space leading to the end of the cylindrical body; wherein a flow coming out of the cylindrical gas-liquid flow damper further separates out a trapped excess gas and returns it to the gas flow through said space in the buffer vessel.

4. The separator of claim 3; wherein the buffer vessel has a drain valve.

5. A method of gas-liquid mixture separation, comprising:
- guiding an unseparated gas-liquid flow through an inlet pipe, an end of the inlet pipe being expanded against a front part of an outlet pipe thus making an annular duct inside a cylindrical body; wherein annular opening is further produced by simultaneous thinning of the walls of said pipes;
- the flow entering a swirler, the swirler comprising a cone; wherein the flow hits a tip the cone and runs along a surface of the cone; wherein a vertex of the cone is facing towards a direction of a liquid-gas flow and thus separates the liquid-gas flow;
- the flow entering an opening between inclined blades of the swirler and further a swirler pipe, the flow experiencing a centrifugal force, which causes the gas-liquid mixture separation; wherein a liquid is further directed by the swirler pipe to be completely separated out of the gas-fluid flow;
- a liquid in a form of a film is running along an internal surface of the inlet pipe and outside the outlet pipe through an annular duct, while a gas exits via the outlet pipe;
- wherein a residual gas trapped in a liquid phase exits to a cylindrical gas-liquid flow damper and is further returned back to a gas flow in the back of the cylindrical body through a space in the buffer vessel which connects to an end portion of the cylindrical body.

\* \* \* \* \*